US007571144B2

(12) United States Patent
Beckstrom et al.

(10) Patent No.: US 7,571,144 B2
(45) Date of Patent: Aug. 4, 2009

(54) SYSTEMS AND METHODS FOR SELECTING POSTAL INDICIA IMAGE FORMATS

(75) Inventors: David W. Beckstrom, Milford, CT (US); Yakup J. Igval, Milford, CT (US); Christian A. Beck, Ridgefield, CT (US)

(73) Assignee: Pitney Bowes Inc., Stamford, CT (US)

( * ) Notice: Subject to any disclaimer, the term of this patent is extended or adjusted under 35 U.S.C. 154(b) by 736 days.

(21) Appl. No.: 11/000,117

(22) Filed: Nov. 30, 2004

(65) Prior Publication Data

US 2006/0116971 A1 Jun. 1, 2006

(51) Int. Cl.
*G06F 17/00* (2006.01)
*G07B 17/02* (2006.01)
*B41J 11/44* (2006.01)

(52) U.S. Cl. .......................... 705/408; 705/401; 400/76

(58) Field of Classification Search ................. 705/401, 705/408
See application file for complete search history.

(56) References Cited

U.S. PATENT DOCUMENTS 5,316,396 A * 5/1994 Fukaya ........................ 400/76
5,707,158 A * 1/1998 Hansel et al. ................. 400/61
5,796,414 A * 8/1998 Sievert et al. ................. 347/19
5,871,288 A 2/1999 Ryan, Jr. et al. ............ 400/103
5,873,073 A 2/1999 Bresnan et al. ............. 705/410
6,233,565 B1 5/2001 Lewis et al. .................... 705/35
6,234,694 B1 5/2001 Brookner ...................... 400/76
6,370,521 B1 * 4/2002 Pigos et al. ..................... 707/2
6,409,294 B1 * 6/2002 Zimmermann et al. .......... 347/2
6,697,703 B2 * 2/2004 Lopez ......................... 700/224
6,939,063 B2 * 9/2005 Bussell ........................ 400/103
6,958,014 B1 * 10/2005 Luciano et al. ............... 463/17
6,982,808 B1 * 1/2006 Ogg et al. .................. 358/1.18
2002/0073052 A1 * 6/2002 Katikaneni et al. .......... 705/408
2004/0215508 A1 * 10/2004 Rebenack et al. ............. 705/14

OTHER PUBLICATIONS

Federal Register, http://ribbs.usps.gov/files/fedreg/USPS97/97-22695.TXT, Aug. 27, 1997.*

* cited by examiner

*Primary Examiner*—John W Hayes
*Assistant Examiner*—Fadey S Jabr
(74) *Attorney, Agent, or Firm*—Michael J. Cummings; Angelo N. Chaclas

(57) ABSTRACT

According to some embodiments, a method of operating a postal indicia printing apparatus comprises storing, in the apparatus, a first indicia image format comprising a first dimension, storing, in the apparatus, a second indicia image format comprising a second dimension that differs from the first dimension, prompting a user of the apparatus to select one of the first and second indicia image formats, receiving a signal indicative of a selection of one of the first and second indicia image formats, and printing, on a mail piece, an indicia image in accordance with the selected indicia image format.

12 Claims, 7 Drawing Sheets

SYSTEMS AND METHODS FOR SELECTING POSTAL INDICIA IMAGE FORMATS

BACKGROUND

This invention relates generally to the field of printing postal indicia, and more particularly to selecting postal indicia image formats.

Postal indicia may be printed on a variety of envelopes, postcards, indicia strip tapes and other mail pieces. However, it may be important to select postal indicia formats based on the mail piece to be printed upon. More generally, it may be desirable to avoid printing postal indicia images that overlap mail piece edges and/or that overlap pre-printed objects on the mail piece.

SUMMARY

Accordingly, systems and methods of operating a postal indicia printing apparatus to select postal indicia image formats are provided.

In one aspect, a method comprises storing, in the apparatus, a first indicia image format comprising a first dimension. The method may further comprise storing, in the apparatus, a second indicia image format comprising a second dimension that corresponds to and differs from the first dimension. In some embodiments, the method may continue by prompting a user of the apparatus to select one of the first and second indicia image formats. The method may further comprise receiving a signal indicative of a selection of one of the first and second indicia image formats. According to some embodiments, the method may comprise printing, on a mail piece, an indicia image in accordance with the selected indicia image format.

The method may further comprise recommending one of the first and second indicia image formats to the user. In some embodiments, the prompting of the user may comprise determining a type of the mail piece, determining that the first and second indicia image formats are associated with the type of the mail piece, and prompting the user to select one of the first and second indicia image formats.

In some aspects, the signal indicative of a selection of one of the first and second indicia image formats may comprise an indication that printing resources are desired to be conserved. The printing resources may comprise, for example, at least one of ink, toner, power, or memory.

According to some embodiments, the signal indicative of a selection of one of the first and second indicia image formats may comprise an indication defining at least one dimension associated with the mail piece that corresponds to the first and second dimensions. The method may further comprise comparing the at least one dimension associated with the mail piece with at least one of the corresponding first or second dimensions, and determining that at least one of the corresponding first or second dimensions are smaller than or equal to the at least one dimension associated with the mail piece. The method may continue by notifying the user of the at least one of the corresponding first or second dimensions determined to be smaller than the at least one dimension associated with the mail piece.

In another aspect, a method comprises storing, in the apparatus, a first indicia image format comprising a first dimension, storing, in the apparatus, a second indicia image format comprising a second dimension that correspond to and differs from the first dimension, determining a size of a mail piece, selecting one of the indicia image formats based at least in part on the determined size of the mail piece, and printing, on the mail piece, an indicia image in accordance with the selected indicia image format. The selecting may comprise, for example, comparing the first and second dimensions to the size of the mail piece, determining that at least one of the first and second dimensions are smaller than the size of the mail piece, and selecting at least one of the first and second indicia image formats based on the determination that at least one of the first and second dimensions are smaller than the size of the mail piece.

In some embodiments, the indicia image format associated with the smaller of the first and second dimensions may be selected such that the indicia image printed in accordance with the indicia image format will not overrun an edge of the mail piece.

In yet another aspect, a method comprises storing, in the apparatus, a first indicia image format comprising a first dimension, storing, in the apparatus, a second indicia image format comprising a second dimension that corresponds to and differs from the first dimension, identifying a location of an object printed on a mail piece, selecting one of the indicia image formats based at least in part on the identified location of the object printed on the mail piece, and printing, on the mail piece, an indicia image in accordance with the selected indicia image format.

In some embodiments, the object printed on the mail piece comprises at least one of a facing indication mark, a postage guide, a return address, or a barcode. In some aspects, the object printed on the mail piece comprises multiple objects. According to some embodiments, the identifying of the location of the object may comprise sensing, by the apparatus, the location of the object printed on the mail piece. The sensing may, for example, be conducted by directing a signal toward the mail piece.

The method may continue by altering the selected indicia image format based at least in part on the identified location of the object printed on the mail piece. The altering may comprise, for example, rearranging at least one portion of the indicia image format such that the indicia image format, when printed on the mail piece, does not overlap the object printed on the mail piece. In some aspects, the altering may comprise reducing a font size used within the indicia image format or deleting human-readable information from the indicia image format.

In still another aspect, a system comprises a postal indicia printing apparatus, comprising, a sensor to identify a mail piece, a memory device to store a plurality of postal indicia image formats, a processor to automatically select one of the plurality of postal indicia image formats, wherein the selection is based at least in part on the identified mail piece, and a printing device to print, on the identified mail piece, an indicia image in accordance with the selected postal indicia image format. In some embodiments, the sensor may be further to locate one or more objects printed on the identified mail piece. In some aspects, the indicia image, when printed in accordance with the indicia image format, may not overlap the one or more objects printed on the identified mail piece. According to some embodiments, the indicia image, when printed in accordance with the indicia image format, may not overlap an edge of the mail piece. Further, one of the plurality of postal indicia image formats may comprise a dimension that differs from a corresponding dimension of a second one of the plurality of postal indicia image formats.

Therefore, it should now be apparent that the claimed embodiments substantially achieve all the above aspects and advantages. Additional aspects and advantages of the claimed embodiments will be set forth in the description that follows, and in part will be discernable from the description, and/or may be learned by practice of the embodiments. Various features and embodiments are further described in the following drawings, description, and claims.

DESCRIPTION OF THE DRAWINGS

The accompanying drawings illustrate aspects of some embodiments, and together with the general description given above and the detailed description given below, serve to explain various principles of some embodiments. Where it has been practicable and/or convenient, like reference numerals have been used to designate like and/or corresponding parts or procedures.

DETAILED DESCRIPTION

Figure 1A:
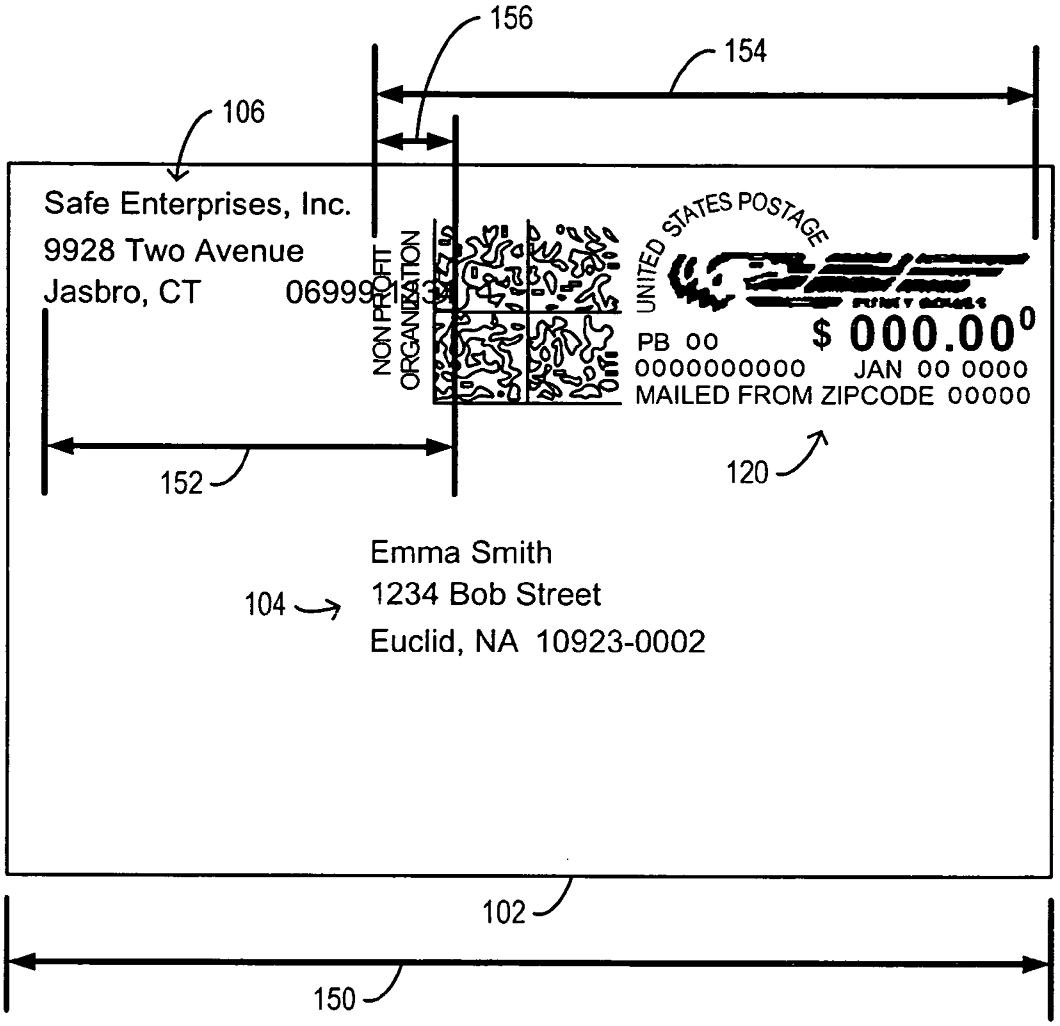
FIG. 1A is a block diagram of an exemplary mail piece.

According to some embodiments, systems and methods may allow a user of a postal indicia printing apparatus to select an indicia image format to print an indicia image on a mail piece. Typical postal indicia image printing apparatus do not allow such a selection, and instead print indicia images using a single postal indicia image format on all mail pieces. Other features such as advertising slogans, graphics, postal endorsements or inscriptions, and/or tracking barcodes may be added to the standard postal indicia image format, but no alternate postal indicia image format may be selected by the user. In another embodiment, portions or fields of the postal indicia may be printed using a postal indicia field priority process. The field priority may be preset or variable and an illustrative priority is shown herein.

In some circumstances, such as in the case that the mail piece is a small postcard and/or includes a pre-printed object (e.g., a return address field, an address field, a barcode, a Facing Indication Mark (FIM), and/or a postage guide), the standard postal indicia image format, when used to print an indicia image on the mail piece, may overlap the pre-printed objects and/or may overrun the mail piece itself. According to some embodiments, a user operating a postal indicia printing apparatus may select from a plurality of available postal indicia image formats. The user may, for example, select a "shorter" postal indicia image format for use on small postcards and/or may select a "modified" version of a postal indicia image format to print an indicia image without overlapping pre-printed objects. According to some embodiments, the postal indicia printing apparatus may automatically determine and/or select a postal indicia image format to utilize to print an indicia image on the mail piece.

As used herein, the terms "printed" and/or "pre-printed" may refer to any form of printing, recording, embossing, etching, and/or any other method for affixing, temporarily or permanently, an object to a medium. In some embodiments for example, an object (e.g., a return address label and/or a barcode) may be printed on a sticker which is adhered to a mail piece. It is to be understood that, as used herein, the adhering of the sticker to the mail piece may be considered "printing" the object on the mail piece.

Some embodiments herein are associated with a "postal indicia image format". As used herein, the term "postal indicia image format" may refer to any information, data, signal, configuration, layout, and/or any other object associated with a postal indicia and/or a postal indicia image. According to some embodiments, a postal indicia image format may be or include a format and/or layout defining one or more printing attributes associated with a postal indicia and/or postal indicia image. The postal indicia image format may, for example, define how various portions of a postal indicia image (e.g., machine-readable and/or human-readable data) are to be printed.

According to some embodiments, postal indicia image formats may define different and/or various dimensions and/or may otherwise define various layouts of postal indicia portions. In some embodiments, one or more postal indicia formats may result in and/or produce shorter, longer, narrower, and/or wider indicia images than other postal indicia image formats. Some postal indicia image formats may be configured and/or customized for printing on certain mail piece types and/or may otherwise define various layouts and/or printing attributes or parameters. In some embodiments, postal indicia image formats may be stored in any form and/or medium that is or becomes known or practicable. Postal indicia image formats may be stored, for example, as images, data files, database files, and/or templates. In some embodiments, a postal indicia image format may be prescribed and/or approved by a postal authority such as the U.S. Postal Service.

As used herein, the terms "information" and "data" may be used interchangeably and may refer to any data, text, voice, video, image, message, bit, packet, pulse, tone, waveform, and/or other type or configuration of signal and/or information. Information may be or include, for example, a data field in the form of a two-dimensional barcode such as a barcode printed in accordance with the "Information-Based Indicia Program (IBIP) Indicium Specification", published by the U.S. Postal Service, Jun. 13, 1996. Information may, according to some embodiments, be compressed, encrypted, and/or otherwise packaged or manipulated in accordance with any method that is or becomes known or practicable.

In addition, some embodiments described herein are associated with an "indication". As used herein, the term "indication" may be used to refer to any information indicative of or associated with a subject, item, entity, and/or other object and/or idea. As used herein, the phrase "information indicative of" may be used to refer to any information that represents, describes, and/or is otherwise associated with a related entity, subject, or object. An indication of information may include, for example, a code, a reference, a link, a signal, an identifier, and/or any combination thereof and/or any other informative representation associated with the information. In some embodiments, an indication of information may be or include the information itself and/or any portion or component of the information. In some embodiments, an indication may include a request, a solicitation, a broadcast, and/or any other form of information gathering and/or dissemination.

Referring first to FIG. 1A, a block diagram of an exemplary mail piece 102 is shown. The various diagrams provided and described herein are depicted for use in explanation, but not limitation, of described embodiments. Different types, layouts, quantities, and configurations of any of the diagrams described herein may be used without deviating from the scope of some embodiments. Fewer or more components than are shown in relation to the diagrams described herein may be utilized without deviating from some embodiments.

The exemplary mail piece 102 may, according to some configurations, comprise a small mail piece such as a postcard. The exemplary mail piece 102 may comprise, for example, an address component 104 and/or a return address component 106. In some configurations, the mail piece 102 may also or alternatively comprise a postal indicia image 120. The postal indicia image 120 may, for example, be printed on the mail piece 102 (e.g., by a personal postage meter such as a Pitney Bowes® Personal Post™ Postage Meter). In some configurations, the mail piece 102 may comprise fewer or more components than are shown in FIG. 1A.

According to some configurations, the mail piece 102 may define one or more dimensions such as the mail piece 102 length dimension 150. The mail piece 102 may, for example, be a postcard having a mail piece 102 length dimension 150 of substantially five inches. In some configurations, the mail piece 102 may also or alternatively define different dimensions (not labeled and/or shown in FIG. 1A). The components 104, 106 of the mail piece 102 may also or alternatively define one or more dimensions. The return address component 106 may, for example, define the return address length dimension 152.

In some configurations, the postal indicia image 120 may define one or more dimensions. As shown in FIG. 1A, for example, the postal indicia image 120 may define the postal indicia length dimension 154. In some configurations, the various dimensions 150, 152, 154 may be corresponding dimensions. As shown in FIG. 1A, for example, all of the dimensions 150, 152, 154 are horizontal length dimensions. Other corresponding dimensions may also or alternatively be utilized according to some configurations. In some configurations, the postal indicia image 120 may be printed in the upper-right corner of the mail piece 102 (e.g., as is standard practice in accordance with U.S. Postal Service regulations). In the case that the postal indicia image 120 is printed in the upper-right corner of the mail piece 102, the postal indicia image 120 may overlap one or more components 104, 106 of the mail piece 102.

As shown in FIG. 1A, for example, the return address length dimension 152 (e.g., justified to the upper-left of the mail piece 102) and the postal indicia length dimension 154 may overlap to define the overlap dimension 156. In other words, the mail piece 102 length dimension 150 may be smaller than the combination of the return address length dimension 152 and the postal indicia length dimension 154. In the case that the return address 106 is left-justified on the mail piece 102 and the postal indicia image 120 is right-justified on the mail piece 102, the postal indicia image 120 may overlap (e.g., defining the overlap dimension 156) the return address 106.

According to some configurations, the postal indicia length dimension 154 may be greater than the mail piece 102 length dimension 150 (not shown). The postal indicia image 120 may, for example, comprise more information than is shown in FIG. 1A, causing the postal indicia image 120 to overrun an edge (e.g., the left edge) of the mail piece 102. The postal indicia image 120 may, for example, comprise any number and/or combination of advertising slogans, postal endorsements and/or inscriptions, tracking barcodes, and/or other information and/or images. In some configurations for example, the postal indicia length dimension 154 may be greater than five inches (e.g., the minimum length of a postcard or envelope in accordance with U.S. Postal Service regulations).

Figure 1B:
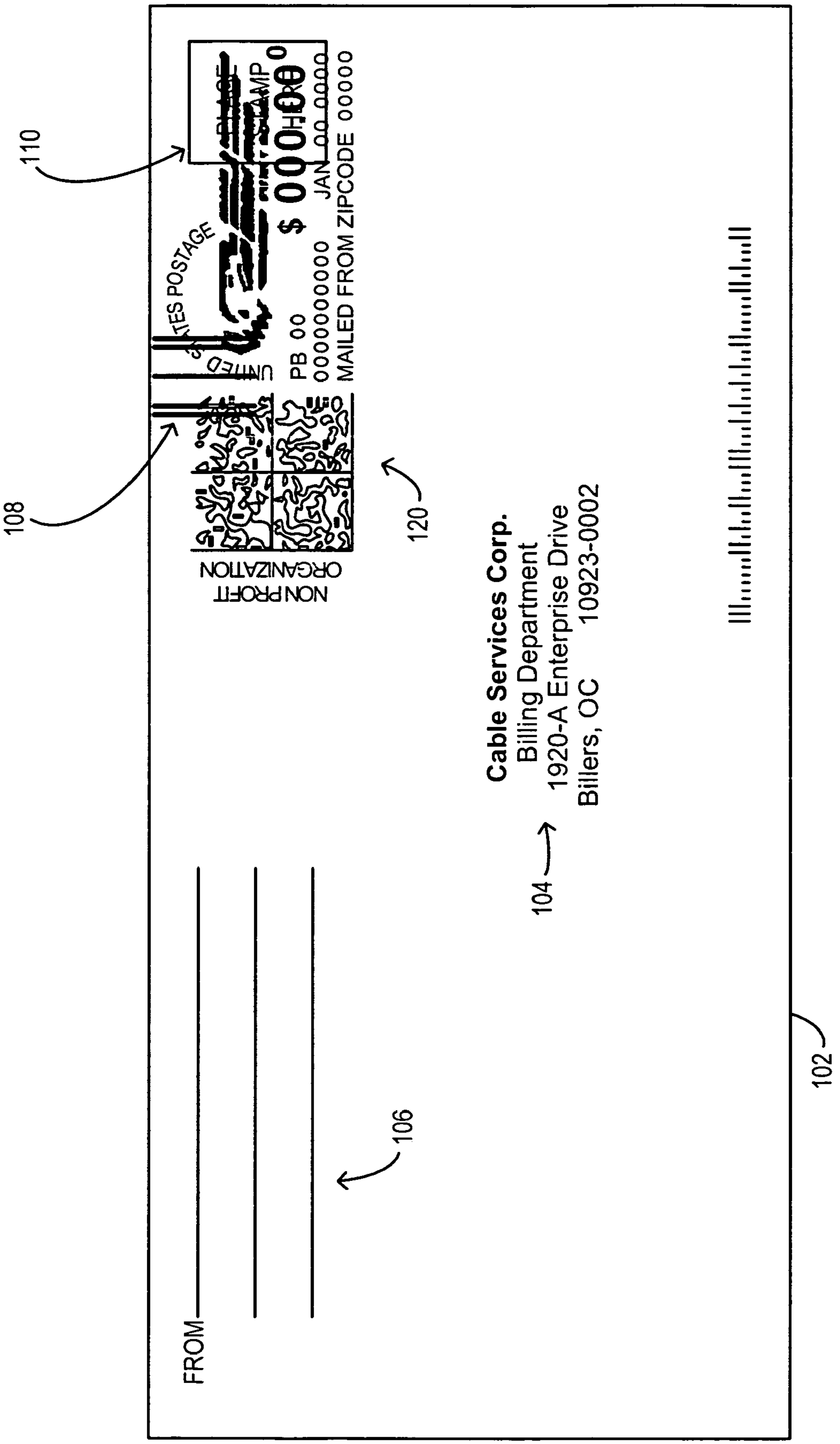
FIG. 1B is a block diagram of an exemplary mail piece.

Turning now to FIG. 1B, a block diagram of an exemplary mail piece 102 is shown. The exemplary mail piece 102 may be similar to the mail piece 102 described in conjunction with FIG. 1A. The mail piece 102 may, according to some configurations, comprise a pre-printed business-size return envelope. The mail piece 102 may, for example, comprise an address component 104, a return address template component 106, a Facing Indication Mark (FIM) component 108, and/or a postage guide component 110. In some configurations, a postal indicia image 120 may be printed on the mail piece 102. The components 104, 106, 120 of the mail piece 102 may be similar in configuration and/or functionality to the similarly-named (and/or numbered) components described in conjunction with FIG. 1A. In some configurations, fewer or more components than are shown in FIG. 1B may be included in the mail piece 102.

In some configurations, the postal indicia image 120 may be the same postal indicia image 120 described in conjunction with FIG. 1A. The postal indicia image 120 may, for example, be or include a standard and/or default image printed on all mail pieces. Even though the information contained within the postal indicia image 120 may be customized for a particular entity, date, and/or mailing, the format of the postal indicia image 120 may remain the same. In some configurations, utilizing the same postal indicia image 120 (and/or same image format) for different mail pieces 102 (and/or mail types) may be problematic. For example, while the postal indicia image 120 printed on the pre-printed return envelope 102 does not overlap the return address template component 106 in FIG. 1B, the same postal indicia image 120 printed on the smaller postcard 102 in FIG. 1A does overlap the return address component 106.

As shown in FIG. 1B, the postal indicia image 120 may also or alternatively be problematic when printed on the pre-printed return envelope 102. The postal indicia image 120 may, for example, overlap the pre-printed FIM component 108 and/or the pre-printed postage guide component 110 on the mail piece 102. At least for these reasons, systems and methods of operating a postal indicia printing apparatus to select postal indicia image formats are desirable.

Figure 2:
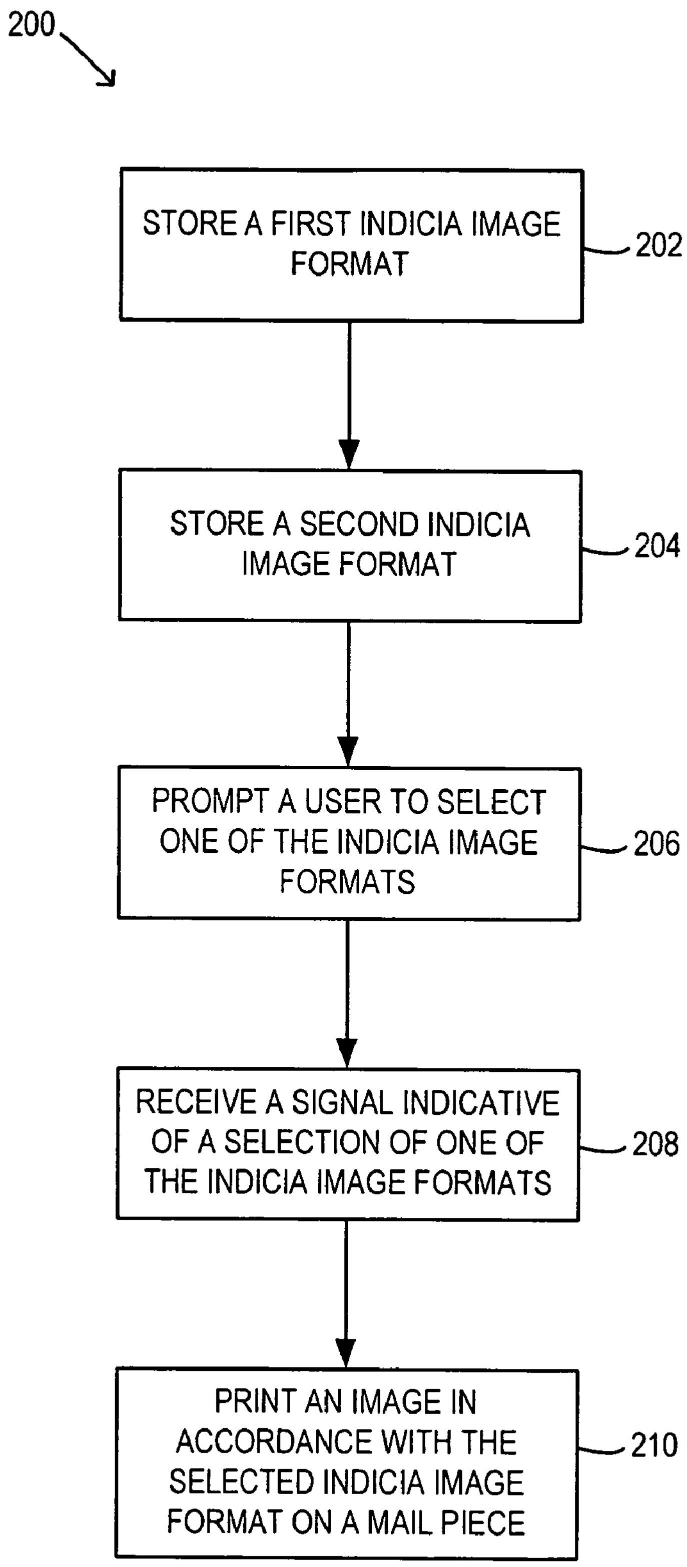
FIG. 2 is a flow diagram of a method according to some embodiments.

Referring to FIG. 2, for example, a method 200 according to some embodiments is shown. In some embodiments, the method 200 may be conducted by and/or by utilizing the mail pieces 102 and/or may be otherwise associated with the mail pieces 102 and/or any of the associated components described in conjunction with any of FIG. 1A and/or FIG. 1B. The method 200 may, for example, be performed by and/or otherwise associated with a mail piece such as the mail piece 102 described herein.

The flow diagrams described herein do not necessarily imply a fixed order to the actions, and embodiments may be performed in any order that is practicable. Note that any of the methods described herein may be performed by hardware, software (including microcode), firmware, manual means, or any combination thereof. For example, a storage medium may store thereon instructions that when executed by a machine result in performance according to any of the embodiments described herein.

In some embodiments, the method 200 may begin at 202 to store a first indicia format. A postal indicia printing apparatus may, for example, store a first postal indicia image format. The indicia image format may be stored in any manner and/or in any medium that is or becomes known or practicable. In some embodiments, the indicia image format may be stored in a database and/or in a memory device associated with the postal indicia printing apparatus.

According to some embodiments, the postal indicia format may comprise a template, an image, code, and/or other instructions defining one or more printing characteristics and/or parameters associated with a postal indicia image. Various portions of a postal indicia image may, for example, be located in different areas and/or positioned differently in accordance with different indicia image formats. According to some embodiments, some indicia image formats may be customized and/or otherwise configured for printing indicia images on certain mail piece types. In some embodiments, the postal indicia image format may be or include a standard and/or default format.

The method 200 may continue, according to some embodiments, to store a second indicia image format at 204. The second indicia image format may, in some embodiments, be stored by a postal indicia printing apparatus (e.g., such as the apparatus that stores the first indicia image format). The second indicia image format may, for example, be an indicia image format that is different than a standard and/or default indicia image format (e.g., the first indicia image format). In some embodiments, the indicia image format may be customized for specific mail piece types and/or to overcome certain difficulties and/or problems. The second indicia image format may, for example, be a shortened version of the first indicia image format, configured for printing indicia images on small mail pieces such as postcards. In other words, the second indicia image format may comprise a length dimension that differs from a corresponding (i.e., length) dimension of the first indicia image format.

According to some embodiments, the method 200 may continue to prompt a user to select one of the indicia image formats, at 206. The postal indicia printing apparatus may, for example, cause a menu item to be displayed (e.g., on a display screen and/or Graphical User Interface (GUI)) that allows a user operating the apparatus to choose which indicia image format to utilize to print an indicia image on the mail piece. The user may, according to some embodiments, realize that the first indicia image format (e.g., a standard and/or default format) may cause an indicia image to overlap pre-printed objects on the mail piece and/or an edge of the mail piece.

In some embodiments, the apparatus may sense pre-printed objects on the mail piece and/or may determine (e.g., from the postal rate class) that the size of the mail piece may not be appropriate and/or desirable for use with the first indicia image format (e.g., a standard indicia image format). According to some embodiments, the apparatus may also or alternatively recommend one of the indicia image formats to the user. In the case that the apparatus determines that the mail piece is a small postcard (e.g., utilizing a scanner and/or other device), for example, the apparatus may prompt the user by recommending and/or suggesting that the second indicia image format (e.g., a shortened indicia image format configured for printing indicia images on postcards) be chosen for printing an indicia image on the postcard mail piece. In some embodiments, the apparatus may determine that a potential conflict between one of the postal indicia image formats and the mail piece (e.g., pre-printed objects on the mail piece and/or the size of the mail piece) exists, and may notify the user of such conflict and/or potential conflict.

In some embodiments, the method 200 may continue at 208 to receive a signal indicative of a selection of one of the indicia image formats. The user of the apparatus may, for example, select one of the stored indicia image formats from a menu, GUI, and/or other input device associated with the postal indicia printing apparatus. In some embodiments, the signal may be received as a response from the prompting at 206. The user may, for example, view and/or otherwise receive the prompt from the apparatus and may then select one of the indicia image formats for use in printing an indicia image on the mail piece.

According to some embodiments, the user may select one of the indicia image formats and/or the apparatus may receive the signal indicative of the selection without the user having been prompted at 206. In other words, the user may be aware that multiple indicia image formats are available and may select one of the indicia image formats without requiring a prompt (and/or before receiving a prompt) from the apparatus. One or more keys, buttons, soft keys, and/or other input devices may, for example, be pre-designated for selection of postal indicia image format selection. In the case that the first indicia image format is a standard format and the second indicia image format is a shortened version (e.g., for use on small mail pieces), for example, the first indicia format may automatically be used by the apparatus (e.g., a default indicia image format) unless the user activates a certain key and/or key combination.

In some embodiments, a keyboard of the apparatus may, for example, comprise a key and/or toggle labeled "Shortened Indicia". The keyboard may also or alternatively comprise a template that shows the user which keystroke combination may be used to select the second indicia image format. According to some embodiments, such as in the case that more than two indicia image formats are available and/or stored by the apparatus, the user may be able to scroll through and/or otherwise select any one of the indicia image formats for use in printing an indicia image on the mail piece.

The user may select one of the indicia image formats for a variety of reasons. The user may, for example, choose a shortened and/or modified indicia image format to prevent the indicia image from overlapping one or more pre-printed objects on the mail piece. Similarly, the user may choose a shortened version of an indicia image to prevent the indicia image from overrunning an edge of the mail piece. In some embodiments, the user may also or alternatively select an indicia image format to conserve printing resources. The user may, for example, select a smaller, shorter, and/or less complex indicia image format to reduce the amount of ink, toner, memory, and/or power required to print the indicia image on the mail piece.

While a standard indicia image format may require a certain amount of ink, toner, memory, and/or power, for example, other indicia image formats may require and/or may be configured to require lesser amounts of any such printing resources. In some embodiments, the prompting at 206 may be based at least in part on conservation of printing recourses. In the case that the apparatus determines that a printing resource is running low, for example, the apparatus may prompt the user to notify the user of the problem and/or may recommend that a particular indicia image format be selected in response to the problem.

The method 200 may continue at 210, for example, to print an indicia image in accordance with the selected indicia image format on the mail piece. Any method of printing the postal indicia image on the mail piece that is or becomes known or practicable may be used. In some embodiments, the selected indicia image format may comprise data fields that may be populated with information prior to being utilized to print an indicia image on the mail piece. The indicia image format may, for example, define where and/or how various portions of information and/or data (e.g., postal rate, postal rate class, meter number, zip code and/or other information) are to be printed. The required information may, according to some embodiments, be retrieved (e.g., from a database and/or file) and utilized to populate the fields defined by the indicia image format. In such a manner, for example, any required and/or desired postal information may be printed on a mail piece utilizing an indicia image format selected by a user.

Figure 3A:
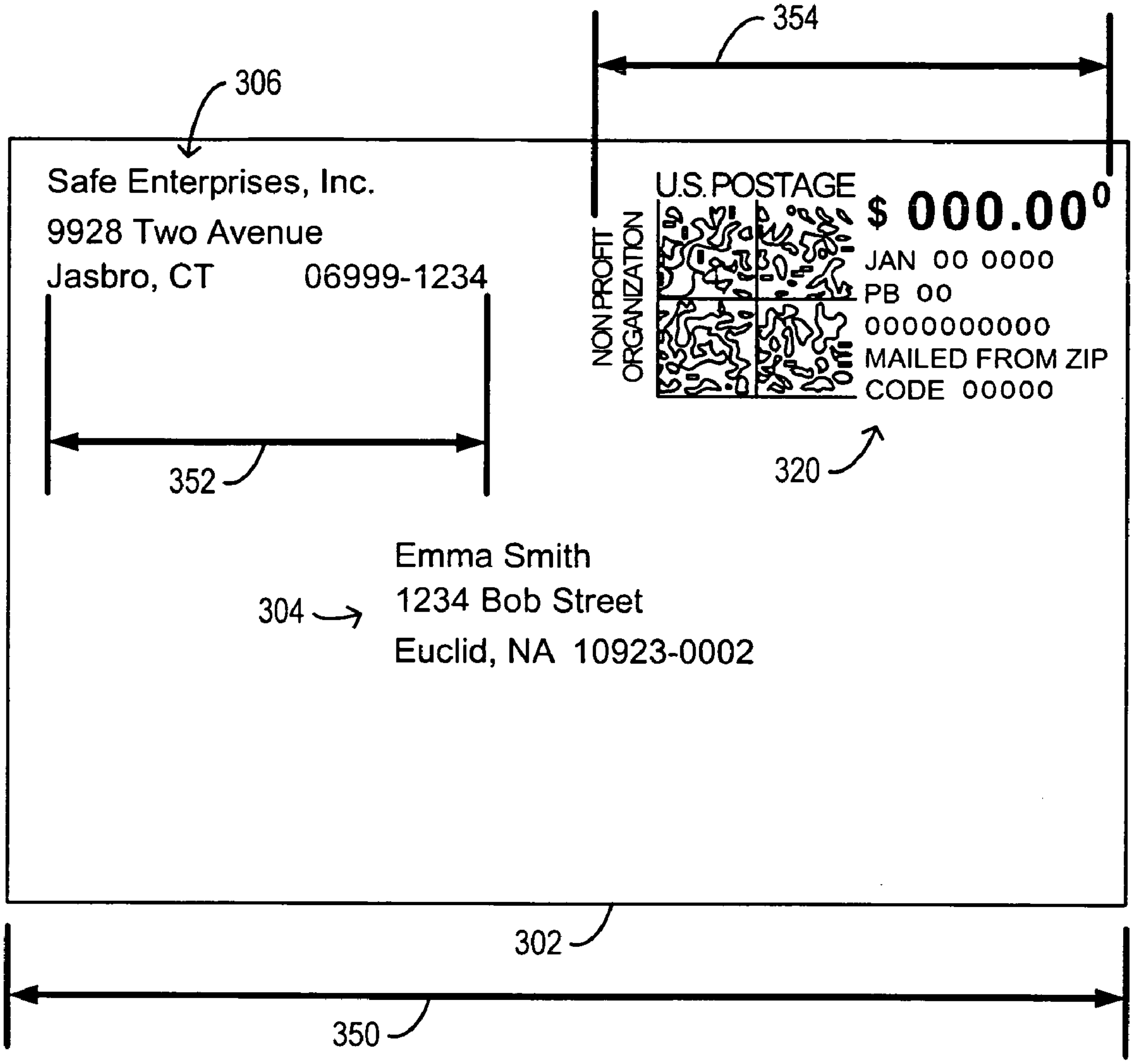
FIG. 3A is a block diagram of an exemplary mail piece according to some embodiments.

Referring now to FIG. 3A, a block diagram of an exemplary mail piece 302 according to some embodiments is shown. The exemplary mail piece 302 may be similar to the mail pieces 102 described in conjunction with any of FIG. 1A and/or FIG. 1B. The mail piece 302 may, according to some embodiments, comprise a small mail piece such as a postcard. The mail piece 302 may, for example, comprise an address component 304 and/or a return address component 306. In some embodiments, a postal indicia image 320 may be printed on the mail piece 302. The components 304, 306, 320 of the mail piece 302 may be similar in configuration and/or functionality to the similarly-named (and/or numbered) components described in conjunction with any of FIG. 1A and/or FIG. 1B. In some configurations, fewer or more components than are shown in FIG. 3A may be included in the mail piece 302.

In some embodiments, the postal indicia image 320 may be printed in accordance with and/or by the method 200 described in conjunction with FIG. 2. The postal indicia image 320 may, for example, comprise a shortened and/or modified indicia image format selected to prevent and/or otherwise avoid overlap printing on the mail piece 302. As shown in FIG. 3A, for example, the postal indicia image 320 may be a condensed and/or shorter version of the postal indicia image 120 shown in FIG. 1A and FIG. 1B. The mail piece 302 length dimension 350 may, for example, be greater than the combination of the return address length dimension 352 and the postal indicia length dimension 354. In other words, the postal indicia length dimension 354 may be substantially small enough to not overlap the return address component 306.

Similarly, the postal indicia length dimension 354 may be substantially small enough to not overrun an edge of the mail piece 302. The postal indicia image 320 may be formatted and/or configured, for example, so that printing of the postal indicia image 320 on the mail piece 302 does not obscure and/or otherwise compromise any required and/or desired postal (and/or other) information. In the exemplary mail piece 302, for example, the postal indicia image 320 may be a modified version of a standard postal indicia image such as the indicia image 120 described in conjunction with FIG. 1A and FIG. 1B.

For example, the "shortened" postal indicia image 320 lacks the eagle image included within the indicia image 120, and other data and/or information within the indicia image 320 is rearranged to shorten the postal indicia length dimension 354. In some embodiments, the font used in the indicia image 320 may also or alternatively be reduced (e.g., to a minimum allowable and/or readable font) and/or other human-readable information and/or all human-readable information may be omitted. Only those portions of the indicia image 320 required by applicable postal regulations (e.g., the two-dimensional barcode and/or another machine-readable indicia) may, for example, be printed on the mail piece 302.

In some embodiments, a user may be presented with multiple possible indicia formats to choose from. There may, for example, be many formatting alternatives that accomplish the desired shortening of the indicia image 320. According to some embodiments, the user may select an indicia image 320 that is preferred, desired, and/or otherwise intended for use. In some embodiments, the user (and/or the postal indicia printing apparatus) may customize, modify, and/or alter an indicia image 320 and/or an associated indicia image format. The user may, for example, manually modify a standard indicia image format to create the shortened indicia image 320. In such a manner, for example, the user may select an indicia image format appropriate for the mail piece 302 while retaining control over which portions (if any) of the indicia image 320 are altered and/or omitted (e.g., to prevent overlap and/or overrun printing and/or conserve printing resources).

Figure 3B:
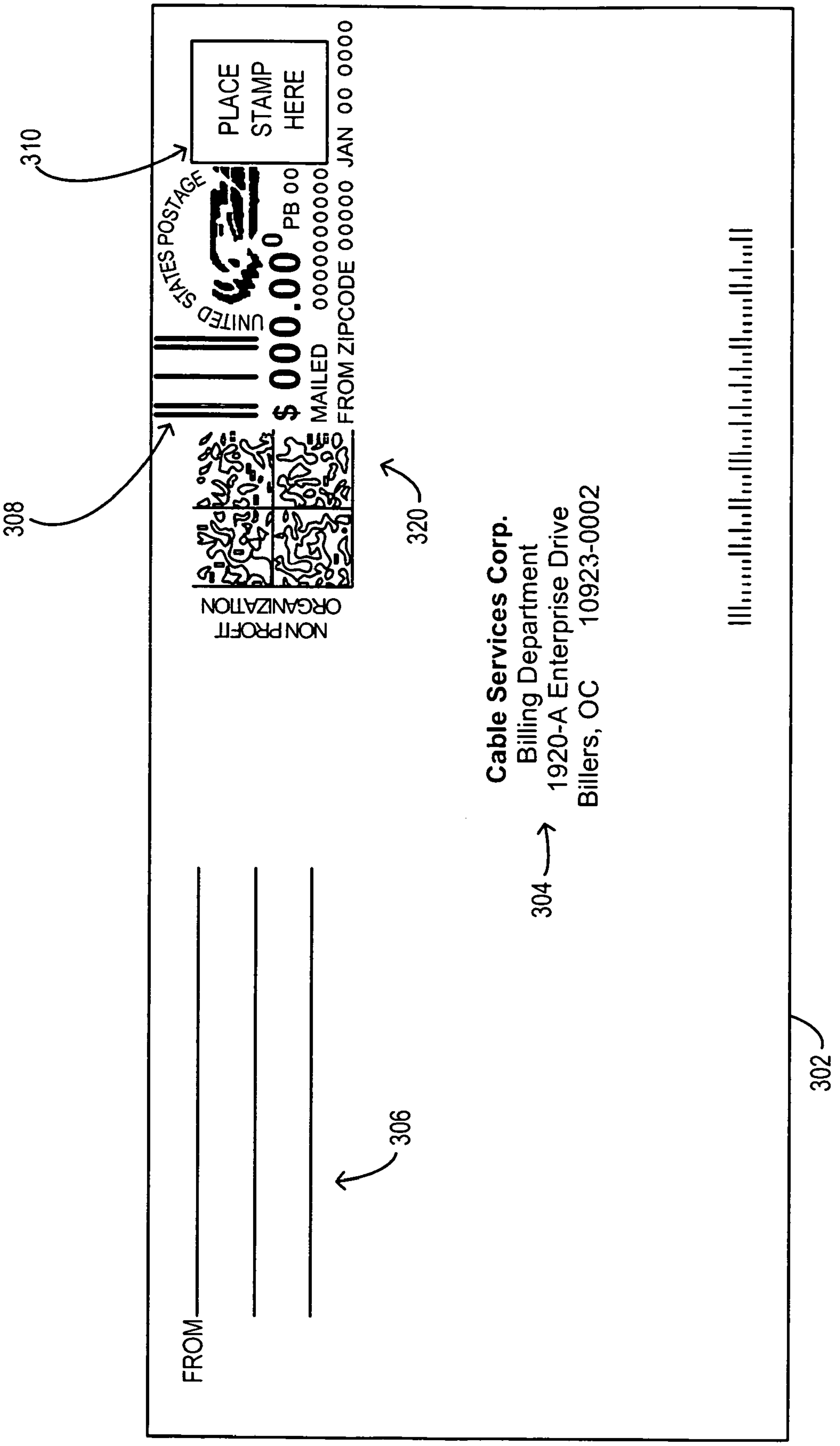
FIG. 3B is a block diagram of an exemplary mail piece according to some embodiments.

Turning to FIG. 3B, a block diagram of an exemplary mail piece 302 according to some embodiments is shown. The mail piece 302 may be similar to the mail pieces 102, 303 described in conjunction with any of FIG. 1A, FIG. 1B, and/or FIG. 3A. The mail piece 302 may, according to some embodiments, comprise a pre-printed business-size return envelope. The mail piece 302 may, for example, comprise an address component 304, a return address template component 306, an FIM component 308, and/or a postage guide 310. In some embodiments, a postal indicia image 320 may be printed on the mail piece 302. The components 304, 306, 308, 310, 320 of the mail piece 302 may be similar in configuration and/or functionality to the similarly-named (and/or numbered) components described in conjunction with any of FIG. 1A, FIG. 1B, and/or FIG. 3A. In some configurations, fewer or more components than are shown in FIG. 3B may be included in the mail piece 302.

In some embodiments, the postal indicia image 320 may be substantially the same length (e.g., have substantially the same the postal indicia length dimension 354) as the postal indicia image 120, 320 described in conjunction with any of FIG. 1A, FIG. 1B, and/or FIG. 3A. The postal indicia image 320 may, according to some embodiments, be modified (e.g., from the standard, default, and/or other indicia image format) to not overlap either or both of the FIM component 308 and the postage guide 310. For example, portions of the indicia image 320 may be omitted, reduced in size and/or font, and/or otherwise shortened and/or removed to prevent conflict with any or all objects pre-printed on the mail piece 302.

As shown in FIG. 3B, for example, the postal indicia image 320 may be altered to fit between, below, and/or around either or both of the FIM component 308 and the postage guide 310. In some embodiments, the eagle image may, for example, be shortened and/or otherwise altered to allow it to fit between the FIM component 308 and the postage guide 310. Similarly, the data fields may be arranged to fit between and/or under the components 308, 310, while the two-dimensional barcode and/or the "non profit organization" slogan may be printed to the left of the FIM component 308.

In some embodiments, the altered indicia image 320 may be longer than the standard and/or default indicia image (e.g., the indicia image 120). At least because overlapping the return address template 306 may not be of great concern on longer mail pieces 302 like business-size envelopes, for example, the length of the indicia image 320 may be extended to facilitate avoidance of the pre-printed components 308, 310. According to some embodiments, such as in the case where pre-printed objects are to be avoided on a small mail piece such as a postcard, the indicia image 320 may need to be shortened as well as restructured to prevent pre-printed object overlapping and/or mail piece 302 overrunning.

Figure 4:
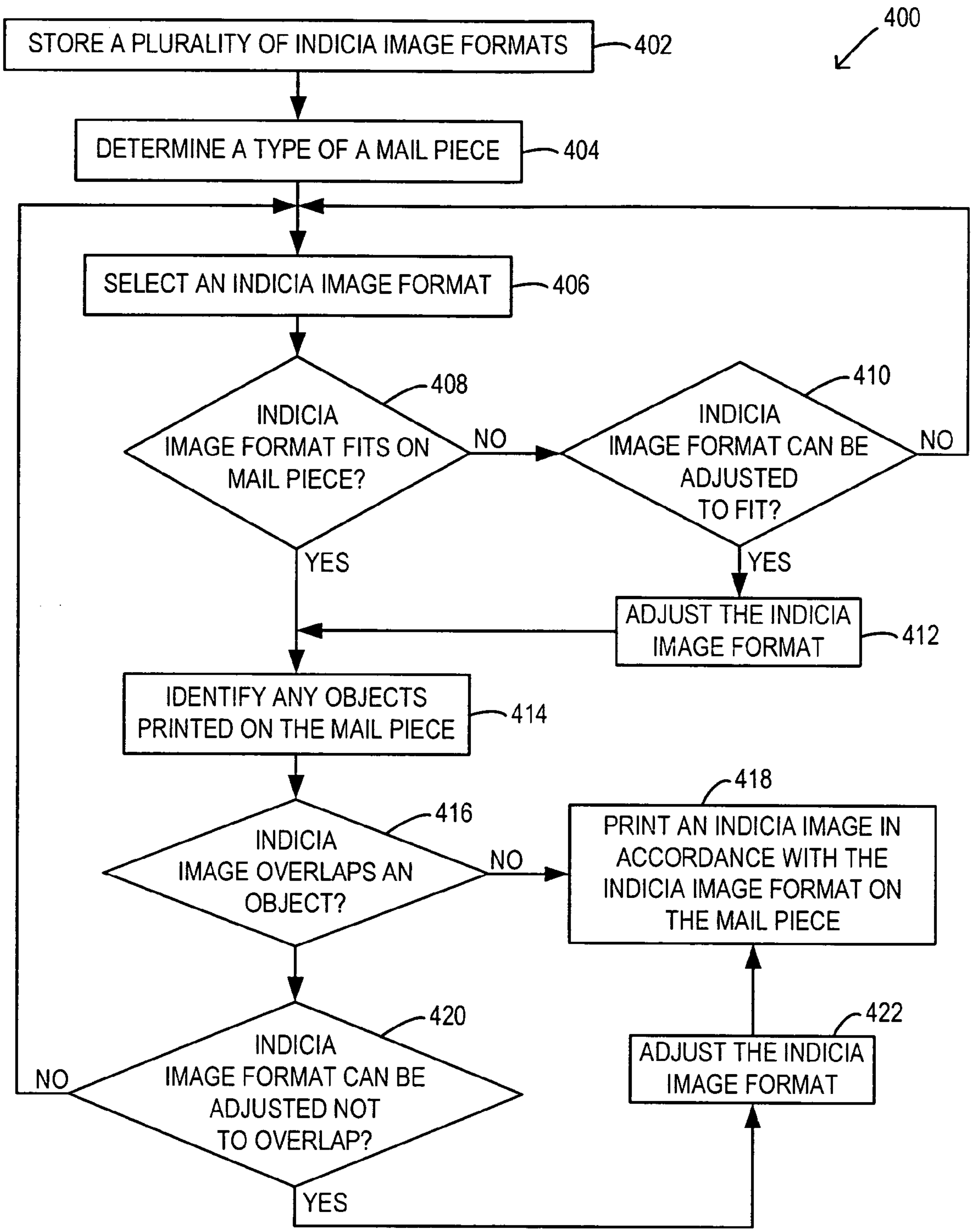
FIG. 4 is a flow diagram of a method according to some embodiments.

According to some embodiments, a postal indicia image format may be selected automatically by the postal indicia image printing apparatus. Referring to FIG. 4, for example, a flow diagram of a method 400 according to some embodiments is shown. In some embodiments, the method 400 may be similar to the method 200 described herein. The method 400 may, for example, be utilized and/or carried out to select and/or print postal indicia images of various formats on mail pieces (e.g., mail pieces 102, 302). According to some embodiments, the postal indicia image formats may be selected to prevent object overlap on the mail piece, prevent overrun of the mail piece itself, and/or to conserve printing resources.

The method 400 may begin at 402, according to some embodiments, to store a plurality of indicia image formats. A postal indicia printing apparatus may, for example, store and/or otherwise have access to various images, templates, and/or other information associated with multiple indicia image formats. The formats may, in some embodiments, comprise different layouts and/or dimensions. Some of the indicia image formats may be configured for small mail pieces and/or some of the indicia image formats may be configured to print indicia images on pre-printed return envelopes (such as the envelopes 102, 302 of FIG. 1B and FIG. 3B). Some indicia image formats may comprise fields for printing various postal and/or user information, and other indicia image formats may comprise different fields and/or different information.

At 404, the method 400 may continue to determine a type of a mail piece. The postal indicia printing apparatus may, for example, scan an inserted mail piece to determine mail piece dimensions. In some embodiments, a user may provide an indication of the mail piece type by, for example, entering a code associated with a particular mail piece type and/or postal rate class. According to some embodiments, such as in the case that the postal indicia printing apparatus stores various mail piece stock and/or is otherwise capable of selecting various mail piece types for printing, the apparatus may automatically determine and/or select the mail piece type.

The method 400 may continue at 406, for example, to select an indicia image format. In some embodiments, such as described in conjunction with the method 200, a user may select the indicia image format. According to some embodiments, the apparatus may automatically select the indicia image format (e.g., without requiring substantial input from the user). The apparatus may, for example, provisionally select an indicia image format such as a standard and/or default indicia image format. In some embodiments, the user may pre-specify and/or select an indicia image format for the apparatus to utilize as a standard and/or default indicia image format.

According to some embodiments, the method 400 may continue at 408 by determining whether the selected indicia image format will fit on the mail piece. The determination at 408 may, for example, be a preliminary determination to check whether the selected indicia image format is appropriate for the mail piece and/or mail piece type. A standard indicia image format may, for example, not be appropriate for printing on a postcard because the standard indicia image may overrun an edge of the postcard. According to some embodiments, the determination at 408 may be made after all postal indicia image components, such as advertising slogans, postal endorsements or inscriptions, and/or tracking barcodes, have been selected (e.g., by a user) and/or determined. In some embodiments, the determination may be made by comparing one or more dimensions of the mail piece with one or more dimensions of the selected indicia image format. In the case that the indicia image format dimension is larger than the dimension of the mail piece, the indicia image format may be determined not to fit on the mail piece.

If it is determined that the indicia image format may not fit on the mail piece, the method 400 may continue at 410 to determine whether the indicia image may be adjusted to fit on the mail piece. The indicia image format may, for example, be adjusted by reducing font and/or image sizes, omitting human-readable information, and/or rearranging the placement and/or organization of indicia information. According to some embodiments, various criteria (e.g., defined by a user) may govern the determination as to whether the indicia image format may be modified to fit the mail piece.

In the case that a user indicates that certain information and/or indicia objects are necessary and/or not to be modified, for example, the indicia image format may not be capable of avoiding overrunning an edge of the mail piece. In some embodiments, if the indicia image format does not fit the mail piece and/or may not be modified (and/or easily modified) to fit the mail piece, the method 400 may revert to 406 to select a different indicia image format. In some embodiments, the apparatus may iterate through indicia image format selections until an indicia image format is selected that does fit on the mail piece and/or may be adjusted to fit on the mail piece.

According to some embodiments, if the indicia image format can be adjusted to fit the mail piece, the method 400 may proceed to 412 to adjust the indicia image format. The indicia image format may be adjusted, for example, to fit within the boundaries of the mail piece and/or to fit within a designated print area of the mail piece. A user may, for example, define various margins, setbacks, and/or other constraints or criteria defining the designated print area for the mail piece. In some embodiments, the user may be prompted to enter and/or define the designated print area. The designated print area may be defined for each and/or every individual mail piece and/or may be defined for one or more classes or types of mail pieces.

In some embodiments, such as in the case that the apparatus stores one or more indicia image formats for various mail piece types, the determinations at 408 and/or 410 may be unnecessary. For example, in the case that the apparatus determines the mail type at 404, the selection of the indicia at 406 may be based upon the determined mail type. In some embodiments for example, such as in the case that the mail piece is determined to be a postcard and/or other small mail piece, the apparatus may select a standard and/or default indicia image associated with the postcard and/or small mail type. The indicia image format may, for example, be selected from a group of indicia image formats pre-determined to fit on mail pieces of the associated mail type (e.g., postcards). According to some embodiments, the method 400 may proceed directly from the indicia image format selection at 406 to the process at 414.

The method 400, whether continuing from the indicia image format selection at 406 or the indicia image format adjustment at 412, may, according to some embodiments, continue at 414 to identify any objects printed on the mail piece. The postal indicia printing apparatus may, for example, direct a signal toward the mail piece (e.g., in the case that the mail piece is inserted into and/or passed through the apparatus). In some embodiments, the signal (and/or a portion thereof) may be bounced back to a receiver of the apparatus. The receipt of the signal by the apparatus, the form, content, and/or other information associated with the signal may, for example, indicate the presence and/or location of any or all objects printed on the mail piece. According to some embodiments, the mail piece may be scanned by the apparatus utilizing any method and/or procedure for scanning documents that is or becomes known or practicable.

In some embodiments, a user may indicate to the apparatus that one or more objects are printed on the mail piece. The user may, for example, designate one or more areas of the mail piece (e.g., by entering margins and/or otherwise defining locations and/or sizes of pre-printed objects) that may be occupied by one or more pre-printed objects. In some embodiments, the user may also or alternatively designate and/or define one or more areas of the mail piece that are free of pre-printed objects (i.e., clear print areas). Pre-printed objects may include, for example, but are not limited to, return addresses and/or return address templates or guides, addresses and/or address templates or guides, barcodes (such as tracking barcodes), FIM objects, logos, postage guides, and/or any combinations thereof.

In some embodiments, an object "printed" on the mail piece may comprise an object adhered to the mail piece and/or an object that creates a discontinuity in the mail piece surface. Such objects may include, for example, but are not limited to, stickers, address and/or return address labels, address and/or return address windows (including cellophane and/or laminated windows), and/or any combinations thereof.

The method 400 may continue at 416, according to some embodiments, by determining whether the indicia image format may overlap an identified object. The size and/or position of the indicia image format may, for example, be compared to the size and/or position of any pre-printed objects determined to be on the mail piece. In the case that the selected indicia image format is determined not to overlap any objects on the mail piece, the method 400 may continue at 418 to print, on the mail piece, an indicia image in accordance with the indicia image format. Any data fields defined by the indicia image format may, for example, be populated and the resulting indicia image may be printed on the mail piece.

In the case that the indicia image format is determined to overlap one or more objects on the mail piece, the method 400 may continue at 420 to determine whether the indicia image format can be adjusted not to overlap the one or more objects.

The apparatus may, for example, alter, rearrange, and/or reposition the indicia image format to avoid overlapping any objects on the mail piece. In some embodiments, a user may provide input to determine how the indicia image format may be adjusted. The user may, for example, determine and/or direct how the indicia image format is to be rearranged and/or repositioned for printing an indicia image on the mail piece without overlapping other objects. In some embodiments, the apparatus may automatically determine how the indicia image format is to be adjusted and/or repositioned. According to some embodiments, the apparatus may iterate through a variety of strategies in an attempt to properly adjust, rearrange, and/or reposition the indicia image format.

In some embodiments, the indicia image format may not be capable of being adjusted to prevent overlap of an object on the mail piece. According to some embodiments, the method 400 may revert to 406 to select a different indicia image format. In some embodiments, the apparatus may prompt the user to make a determination. The apparatus may, for example, notify the user of the inability to prevent overlap and/or may request that the user determine a course of action. The user may, for example, determine that the method 400 is to revert to 406 and that a different indicia image format be selected. In some embodiments, the user may command the apparatus to print the indicia image utilizing the selected indicia image format despite the overlap. In the case that the overlap has been minimized by indicia image selections and/or adjustments made by the apparatus, for example, and/or the overlap is substantially unavoidable, the user may desire that the indicia image format be used to print an indicia image on the mail piece nonetheless.

In the case that the indicia image format may be adjusted to avoid overlapping objects printed on the mail piece, the method 400 may continue at 422 to adjust the indicia image format. According to some embodiments, once the indicia image format is adjusted to avoid overlap printing, the method 400 may continue at 418 to print, on the mail piece, an indicia image in accordance with the indicia image format. In such a manner, for example, an indicia image format may be selected that results in printing an indicia image on the mail piece that does not overrun the mail piece and/or overlap objects on the mail piece.

According to some embodiments, the apparatus may also or alternatively select and/or prioritize indicia image format selection to conserve printing resources. The apparatus may, for example, determine that a printing resource is to be conserved (e.g., ink and/or toner is determined to be low and/or memory and/or battery power is determined to be low) and automatically select an indicia image format configured to reduce the consumption of the printing resource. In some embodiments, a user may utilize a setup program to configure the apparatus. The user may, for example, prioritize the prevention of overlap and/or overrun printing over the conservation of printing resources. According to some embodiments, the user may specify if and/or when printing resources are to be conserved.

Figure 5:
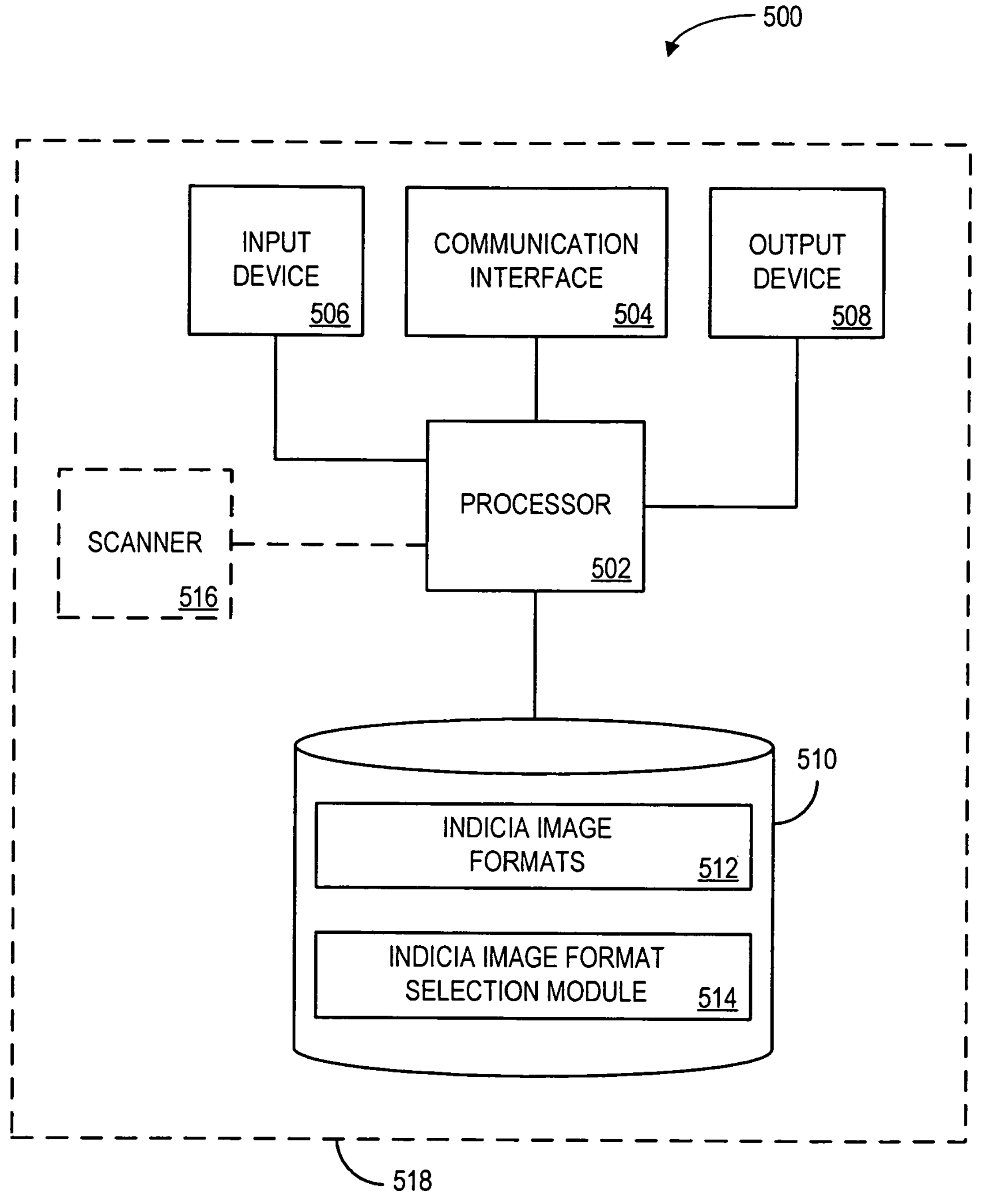
FIG. 5 is a block diagram of a system according to some embodiments.

Referring now to FIG. 5, a block diagram of a system 500 according to some embodiments is shown. The system 500 may, for example, be utilized to implement and/or perform the methods 200, 400 described herein and/or may be associated with the mail pieces 102, 302 described in conjunction with any of FIG. 1A, FIG. 1B, FIG. 2, FIG. 3A, FIG. 3B, and/or FIG. 4. In some embodiments, fewer or more components than are shown in FIG. 5 may be included in the system 500. According to some embodiments, different types, layouts, quantities, and configurations of systems may be used.

In some embodiments, the system 500 may be or include postal indicia printing apparatus such as a personal postage meter. The system 500 may also or alternatively comprise a computer such as a Personal Computer (PC) or computer server. The system 500 may include, for example, one or more processors 502, which may be any type or configuration of processor, microprocessor, and/or micro-engine that is or becomes known or available. In some embodiments, the system 500 may also or alternatively include one or more communication interfaces 504, one or more input devices 506, one or more output devices 508, and/or a memory device 510, all and/or any of which may be in communication with the processor 502. The memory device 510 may store, for example, indicia image formats 512 and/or an indicia image format selection module 514.

The communication interface 504 may be or include any type and/or configuration of communication device that is or becomes known or available. In some embodiments, the communication device 504 may allow the system 500 (and/or the processor 502) to communicate with, for example, one or more other systems and/or devices such as other postal-related devices. According to some embodiments, the communication interface 504 may be or include a Network Interface Card (NIC) such as an Intel® PRO/1000 MT Desktop Adaptor that operates in accordance with the Fast Ethernet LAN transmission standard 802.3-2002® published by the Institute of Electrical and Electronics Engineers (IEEE), or an Intel® PRO/Wireless 2225BG Network Connection that operates in accordance with the Wireless LAN transmission standard 802.11B/G-1999/2003® published by the IEEE.

The input device 506 may be or include one or more conventional devices such as a keypad or discrete buttons, a keyboard, a mouse, a trackball, etc. The input device 506 may be utilized, for example, by a user to interface with the system 500 to select postal indicia image formats and/or print postal indicia images in accordance with embodiments described herein. The output device 508 may be or include any type of output device that is or becomes known or practicable, including, but not limited to, a printer, a Cathode Ray Tube (CRT) display device, a Liquid Crystal Display (LCD) device, and/or a Light-Emitting Diode (LED) display device. In some embodiments, the output device 508 may be or include a printer to print postal indicia images in accordance with one or more of the indicia image formats 512.

The memory device 510 may be or include, according to some embodiments, one or more magnetic storage devices, such as hard disks, one or more optical storage devices, and/or solid state storage. The memory device 510 may store, for example, the indicia image formats 512 and/or the indicia image format selection module 514. In some embodiments, the indicia image format selection module 514 may store instructions that cause the processor 502 to operate in accordance with embodiments described herein. The indicia image format selection module 514 may, for example, automatically select one of the indicia image formats 512 for use in printing an indicia image on a mail piece.

In some embodiments, the system 500 and/or the processor 502 may, for example, operate in accordance with any of the methods 200, 400 described herein. According to some embodiments, the system 500 may utilize the indicia image format selection module 514 to automatically select an indicia image format 512 to utilize in printing an indicia image on a mail piece. The indicia image format 512 may be selected, for example, to print an indicia image on the mail piece without overlapping objects on the mail piece and/or without overrunning an edge of the mail piece itself.

According to some embodiments, the indicia image format selection module 514 may also or alternatively select an indicia image format 512 to conserve a printing resource. A user may direct the system 500, for example, to automatically utilize the smallest indicia image format 512 that is practicable for use in printing an indicia image on a given mail piece and/or mail type. In some embodiments, the system 500 and/or the processor 502 may automatically determine that a printing resource is to be conserved and may automatically select an indicia image format 512 configured to conserve the printing resource.

In some embodiments, the system 500 may also or alternatively comprise a scanner 516. The scanner 516 may, for example, be any type and/or configuration of device capable of detecting, identifying, and/or otherwise determining the presence and/or characteristics of a mail piece. According to some embodiments, the scanner 516 may be utilized to determine a type of mail piece. The scanner 516 may, for example, determine one or more dimensions associated with a mail piece (e.g., a mail piece inserted into the scanner 516 and/or otherwise associated with the system 500). In some embodiments, the scanner 516 may provide scanning information to the processor 502 (e.g., to determine the mail piece type and/or other characteristics).

Any or all components 502, 504, 506, 508, 510, 516 of the system 500 may, according to some embodiments, be contained in and/or supported by a housing 518. The housing 518 may, for example, be a compact housing such as a compact housing of conventional postage meters. In the case that the system 500 is a personal postage meter, for example, the housing 518 may be or include a compact plastic housing that contains one or more of the components 502, 504, 506, 508, 510, 516. In some embodiments, such as in the case that the housing 518 houses the scanner 516, the housing 518 may define an opening (not shown) that permits a mail piece to be inserted into the system 500 to be scanned and/or printed upon (e.g., a postal indicia image may be printed by the output device 508).

In an alternative embodiment, the use of postal indicia strip tapes is facilitated. Certain mailing machines and postage meters may print postage indicia on strip tapes that may be later affixed to a mail piece. In this embodiment, precut strip tapes of a certain length are utilized. When the mailing machine is placed in the strip tape-printing mode, the system prompts the user to enter or select the size of the strip tapes that are being used. The system either prompts the user for a selection among commonly used strip tape sizes or requests entry of the length using the numeric keypad.

In another alternative embodiment, the mailing machine postage meter includes the capability to print portions of the postal indicia based upon a postal indicia field priority list. For example, a representative postal indicia includes several field such as a 2D barcode including postage indicia data (priority level 1), a human readable indicia portion that includes a postage amount, zip code, and meter number among other human readable sub fields (priority level 2) and an inscription (priority level 3). Additionally, the postal indicia includes an ad slogan (priority level 4). Depending on the size of the mail piece available for printing, the system drops fields that will not fit in priority order. If the mailing machine is also printing additional fields such as a return address (priority level 5), tracking barcode (priority level 6) or other fields, those fields may also be assigned a priority for printing on a mail piece. In that way, the system may determine not to print the mail piece return address and instead print a full postal indicia. In an alternative setting, the system may print the return address, but instead select to print a short postal indicia due to the presence and/or size of the return address field.

The words "comprise," "comprises," "comprising," "include," "including," and "includes" when used in this specification and in the following claims are intended to specify the presence of stated features, elements, integers, components, or procedures, but they do not preclude the presence and/or addition of one or more other features, elements, integers, components, procedures, and/or combinations thereof.

A number of embodiments have been described. Nevertheless, it will be understood that various modifications may be made without departing from the spirit and scope of some embodiments. Accordingly, other embodiments are within the scope of the following claims.

What is claimed is:

1. A method of operating a postal indicia printing apparatus, comprising:

storing, in the apparatus, a first indicia image format;

storing, in the apparatus, a second indicia image format that is dimensioned to avoid mail piece limitations that would otherwise interfere with an indicia having the first indicia image format;

comparing the at least one dimensional limitation associated with the mail piece with dimensions of the first and second formats;

determining that dimensions of the first or second format is compatible with the dimensional limitation associated with the mail piece;

notifying a user of a lack of compatibility of one of the first and second formats with dimensional limitations of the mail piece;

prompting the user of the apparatus to select one of the first and second indicia image formats;

receiving a signal indicative of a selection of one of the first and second indicia image formats; and printing, on a mail piece, an indicia image in accordance with the selected indicia image format, the indicia image accordingly dimensioned to avoid mail piece limitations that could interfere with the indicia image.

2. The method of claim 1 further comprising:

determining a length of the mail piece, wherein the length of the mail piece is a dimensional limitation of the mail piece; and selecting one of the indicia image formats based at least in part on the determined length of the mail piece.

3. The method of claim 2, wherein the selecting comprises:

comparing a length of the mail piece to lengths of the first and second formats;

determining that at least one of the first and second formats that are shorter than the mail piece; and selecting at least one of the first and second formats based on the determination that at least one of the first and second formats are shorter than mail piece.

4. The method of claim 2, wherein the indicia image format is selected such that the indicia image printed in accordance with the indicia image format will not overrun an edge of the mail piece.

5. The method of claim 1, comprising:

identifying a location of a pre-printed image on the mail piece;

wherein the pre-printed image is a dimensional limitation of the mailpiece; and selecting one of the indicia image formats based at least in part on the identified location of the pre-printed image on the mail piece.

6. The method of claim 5, wherein the pre-printed image on the mail piece comprises at least one of a facing indication mark, a postage guide, a return address, or a barcode.

7. The method of claim 5, wherein the pre-printed image on the mail piece comprises multiple images.

8. The method of claim 5, wherein the identifying of the location of the pre-printed image comprises:

sensing, by the apparatus, the location of the pre-printed image.

9. The method of claim 5, further comprising:

altering the selected indicia image format based at least in part on the identified location of the pre-printed image on the mail piece.

10. The method of claim 9, wherein the altering comprises:

rearranging at least one portion of the indicia image format such that the indicia image printed in accordance with the indicia image format will not overlap the pre-printed image on the mail piece.

11. The method of claim 8, wherein the altering comprises:

reducing a font size used within the indicia image format.

12. The method of claim 9, wherein the altering comprises:

deleting human-readable information from the indicia image format.

* * * * *